(12) United States Patent
Daniell et al.

(10) Patent No.: US 7,173,902 B2
(45) Date of Patent: Feb. 6, 2007

(54) EXPANSION OF TELECOMMUNICATIONS NETWORKS WITH AUTOMATIC PROTECTION SWITCHING

(75) Inventors: Piers John Daniell, Los Gatos, CA (US); Heena Nandu, Sunnyvale, CA (US); Srinivasan Murari, Fremont, CA (US)

(73) Assignee: Bay Microsystems, Inc., San Jose, CA (US)

( * ) Notice: Subject to any disclaimer, the term of this patent is extended or adjusted under 35 U.S.C. 154(b) by 1112 days.

(21) Appl. No.: 10/112,557

(22) Filed: Mar. 29, 2002

(65) Prior Publication Data
US 2003/0185149 A1    Oct. 2, 2003

(51) Int. Cl.
*H04L 12/42* (2006.01)
(52) U.S. Cl. ...................... 370/222; 370/258
(58) Field of Classification Search ............ 370/217, 370/222, 224, 258
See application file for complete search history.

(56) References Cited

U.S. PATENT DOCUMENTS

| | | | |
|---|---|---|---|
| 5,365,510 A | 11/1994 | Nicholson et al. | |
| 6,141,320 A | 10/2000 | Ikawa | |
| 6,349,092 B1 * | 2/2002 | Bisson et al. | 370/258 |

* cited by examiner

*Primary Examiner*—Melvin Marcelo

(57) ABSTRACT

A telecommunications network node architecture is disclosed that enables a telecommunications network that uses automatic protection switching to be expanded to include more nodes than its standard protocol provides for without modifying the standard protocol or the existing nodes in the network. Although the illustrative embodiment is depicted as using the SONET/SDH protocol, it will be clear to those skilled in the art, after reading this specification, how to make and use embodiments of the present invention that use automatic protection switching with another protocol. The illustrative embodiment comprises: an automatic protection switching channel that defines an address space in the telecommunications network; a node that is uniquely identified by an address in the address space; and a node that is not uniquely identified by an address in the address space.

19 Claims, 8 Drawing Sheets

EXPANSION OFTELECOMMUNICATIONS NETWORKS WITH AUTOMATIC PROTECTION SWITCHING

FIELD OF THE INVENTION

The present invention relates to the field of telecommunications, and, more specifically, to a means to increase the number of nodes in a telecommunications network (e.g., a SONET/SDH network, a dense wavelength division multiplexing network, etc.) that has automatic protection switching beyond current limitations without changing the telecommunications network's protocol or the existing nodes in the network.

BACKGROUND OF THE INVENTION

Today, optical fiber systems are in widespread use in both public and private telephone and data networks. In the early stages of optical fiber networks, however, deployment was limited to high-revenue-generating applications. This limited deployment was due to communications-equipment manufacturers making network components using unique, proprietary architectures. The result of which, of course, was that the network components from one manufacturer did not work with other manufacturers' network components. An operating company implementing an early optical fiber network had to purchase most, if not all, of its network components from one manufacturer.

In order to provide inter-operability among components from the various manufacturers (and thus lower costs to the operating companies), Bellcore established a standard for connecting one optical fiber component or system to another. That standard is officially named the "Synchronous Optical Network," but is more commonly called "SONET." The international version of the standard is officially named the "Synchronous Digital Hierarchy," but it is more commonly called "SDH."

Although differences exist between SONET and SDH, those differences are mostly in terminology. In most respects, the two standards are the same and, therefore, virtually all equipment that complies with either the SONET standard or the SDH standard also complies with the other. Therefore, for the purposes of this specification, the SONET standard and the SDH standard shall be considered interchangeable and the acronym/initialism "SONET/SDH" shall be defined as either the Synchronous Optical Network standard or the Synchronous Digital Hierarchy standard, or both.

The basic SONET/SDH signal is defined as a Synchronous Transport Signal level 1 (STS-1) frame. An STS-1 frame is an 810-byte data packet that comprises transport overhead (the information required to maintain communication) and payload (the data itself). For the purposes of this specification, a "STS-N" is defined to comprise N STS-1s. For example, an STS-768 comprises the data from 768 STS-1s plus the overhead of the STS-768. Furthermore, for the purposes of this specification, an "STS-N frame" is defined to comprise N STS-1 frames of data and the overhead of the STS-N frame. For example, an STS-768 frame comprises 768 STS-1 frames.

Also, for the purposes of this specification, a "SONET/SDH network" is defined as two or more nodes and transmission facilities (e.g., optical fibers, repeaters, etc.) that connect the nodes. FIG. 1 illustrates a block diagram of a SONET/SDH network 10 in the form of a "ring," as is well known in the art. In this elementary example, there are three nodes 12, 14 and 16 connected in a closed loop by a pair of optical-transmission facilities 18 and 20.

For the purposes of this specification, a "node" is defined as a network element in a telecommunications network that;
  i. originates and/or terminates digital signals, or
  ii. that digitally cross-connects digital signals, or both i and ii.

In this example, each of nodes 12, 14, and 16 is connected to a plurality of sources and/or destinations for data traffic, which are well known in the art as "tributaries." Node 12 originates/terminates traffic between network 10 and tributaries 32, node 14 originates/terminates traffic between network 10 and tributaries 34 and node 16 originates/terminates traffic between network 10 and tributaries 36. Each of nodes 12, 14, and 16 receives data from one or more of its respective tributaries 32, 34, and 36 at an STS-N rate, multiplexes the data to the data rate of the ring (which is, by definition, higher than the data rate of the tributaries), and transmits the data around SONET/SDH ring 10. Simultaneously, each of nodes 12, 14, and 16 receives data from the SONET/SDH ring 10, demultiplexes the data to the data rate of the destination tributary and sends the data on the tributary.

As stated above, each of nodes 12, 14, and 16 in SONET/SDH ring 10 is connected to the next node by a pair of optical transmission facilities 18 and 20. In normal operation, each node transmits STS-N frames around ring 10 either counterclockwise on optical transmission facilities 18 or clockwise on optical transmission facilities 20.

When a discontinuity or failure occurs in a SONET/SDH ring, the affected traffic is re-routed around the discontinuity in accordance with a procedure called "automatic protection switching." In order to implement automatic protection switching, each SONET/SDH ring defines a distinct address space and a unique address (or "Node ID") that uniquely identifies each node within the network. The current SONET/SDH standard specifies that addresses in the address space of a SONET/SDH ring are carried in the $K_1$ and $K_2$ bytes in the line overhead of an STS-N frame.

The $K_1$ and $K_2$ bytes comprise:

| | | |
|---|---|---|
| $K_1$ Byte: | Bits 1–4: | Type of automatic protection switch request (lock out of automatic protection switching, forced switch, signal failure, signal degradation, manual switch, etc.). |
| | Bits 5–8: | The destination Node ID of the automatic protection switch message. |
| $K_2$ Byte: | Bits 1–4: | Source Node ID of the automatic protection switch message. |
| | Bit 5: | Indication of automatic protection switching (short or long path). |
| | Bits 6–8: | Mode of operation (Line alarm indication signal, line remote defect indication, etc.). |

In the example of FIG. 1, nodes 12, 14, and 16 have Node ID's according to Table 1:

TABLE 1

Node Addresses for SONET/SDH Ring 10

| Node | SONET/SDH Ring 10 Node ID |
|---|---|
| Node 12 | 0 |
| Node 14 | 1 |
| Node 16 | 2 |

For purposes of understanding automatic protection switching in the prior art, assume that node 12 is receiving traffic on one or more tributaries 32 destined for node 14's tributaries 34. Furthermore, assume that node 14 detects a fault or failure on the optical transmission facility 18 between node 12 and node 14. Node 14 notifies both node 12 and node 16. To this end, node 14 populates an STS-N frame overhead $K_1$ and $K_2$ bytes for node 12 as follows:

| | | |
|---|---|---|
| $K_1$: | bits 1–4 | automatic protection switch request. |
| | bits 5–8: | the Node ID of node 12 ("0" in this example). |
| $K_2$: | bits 1–4: | its own Node ID ("1" in this example). |
| | bit 5: | short path. |
| | bits 6–8: | the remote defect indication ("RDI"). |

Node 14 sends the STS-N frame in the clockwise 20 direction.

Node 14 notifies node 16 by populating an STS-N frame overhead $K_1$ and $K_2$ bytes as follows:

| | | |
|---|---|---|
| $K_1$: | bits 1–4 | automatic protection switch request. |
| | bits 5–8: | the Node ID of node 12 ("0" in this example). |
| $K_2$: | bits 1–4: | its own Node ID ("1" in this example). |
| | bit 5: | long path. |
| | bits 6–8: | the bridged and switched state. |

Node 14 sends the STS-N frame in the counterclockwise 18 direction.

Node 12 receives the $K_1$ and $K_2$ bytes from the STS-N frame on clockwise optical transmission facility 20. Node 12 reacts to the $K_1$ and $K_2$ bytes by discontinuing transmission on optical transmission facility 18, and switching to clockwise optical transmission facility 20. In the counterclockwise direction, node 16 reads the $K_1$ and $K_2$ bytes, notes that its own Node ID, "2," is not in the $K_2$ byte, and does not change the $K_1$ and $K_2$ bytes ("pass through mode").

For the purposes of this specification, the term "short path" is defined as the path between the two nodes adjacent to the failed span that includes the failed span, and the term "long path" is defined as the path between the two nodes adjacent to the failed span that does not include the failed span. Therefore, when a discontinuity or failure occurs in a SONET/SDH ring, the affected traffic is re-routed from the short path to the long path.

The example of FIG. 1 illustrates only three nodes in network 10. More nodes are usually present, as is well known in the art. A problem in the art exists, however, because the SONET/SDH standard limits the maximum number of source and destination nodes in it definition of $K_1$ and $K_2$ bytes to four bits, or 16, thus limiting the size and flexibility of SONET/SDH rings. As demand for data traffic increases, this limitation on the number of nodes in a ring requires that, after 16 nodes are equipped in a network, an entire new network must be added at considerable expense.

Furthermore, the number of tributaries in one location along the ring can require more tributaries that one node can support. In the prior art, this scenario requires a new node to be defined in the address space of the network. Therefore, it is an object of this invention to provide a means to increase the number of nodes in a SONET/SDH network beyond current limitations without changing the SONET/SDH standard or modifying the existing nodes in the ring.

SUMMARY OF THE INVENTION

The present invention provides a telecommunications network node architecture that avoids some of the costs and disadvantages of telecommunications network node architectures in the prior art. In particular, the present invention enables a telecommunications network that uses automatic protection switching to be expanded to include more nodes than its standard protocol provides for without modifying the standard protocol or the existing nodes in the network. Although the illustrative embodiment is depicted as using the SONET/SDH protocol, it will be clear to those skilled in the art, after reading this specification, how to make and use embodiments of the present invention that use automatic protection switching with another protocol (e.g., dense wavelength division multiplexing, etc.).

In particular, the illustrative embodiment of the present invention enables a first node in a SONET/SDH ring to affect the operation of a second node in the ring, wherein the second node does not have an address within the address space of the SONET/SDH network, wherein the address space of the SONET/SDH network is defined by bits 5–8 of the $K_1$ byte and bits 1–4 of the $K_2$ byte of the line overhead.

In accordance with the illustrative embodiment, a node in a SONET/SDH network that does not have an address in the address space of the network, as defined by the $K_1$ and $K_2$ bytes of the line overhead, is referred to as an "invisible" node. Furthermore, an "invisible" node can originate, terminate, and/or switch STS-N channels, and can modify the section, line, and path overhead, as necessary or appropriate, except that an "invisible" node does not modify the $K_1$ byte of the line overhead. In other words, the "invisible" node monitors the $K_1$ and $K_2$ bytes of the line overhead and modifies its operation based on the $K_1$ and $K_2$ bytes of the line overhead, but an "invisible" node does not modify the $K_1$ byte of the line overhead.

In contrast, a node in a SONET/SDH network that has an address in the address space of the network, as defined by the $K_1$ and $K_2$ bytes of the line overhead, is herein referred to as a "visible" node. In accordance with the illustrative embodiment, a "visible" node can originate, terminate, and/or switch STS-N channels, and can modify the section, line, and path overhead, including the $K_1$ and $K_2$ bytes of the line overhead.

When an invisible node receives an STS-N frame that indicates the need for automatic protection switching, the invisible node performs the automatic protection switching as necessary and forwards the STS-N frame on to the next node without modifying the $K_1$ and $K_2$ bytes of the line overhead.

The illustrative embodiment comprises: an automatic protection switching channel that defines an address space in the telecommunications network; a node that is uniquely identified by an address in the address space; and a node that is not uniquely identified by an address in the address space.

BRIEF DESCRIPTION OF THE DRAWINGS

A more complete understanding of the invention can be obtained from a consideration of the specification in conjunction with the drawings, in which.

DETAILED DESCRIPTION

Figure 1:
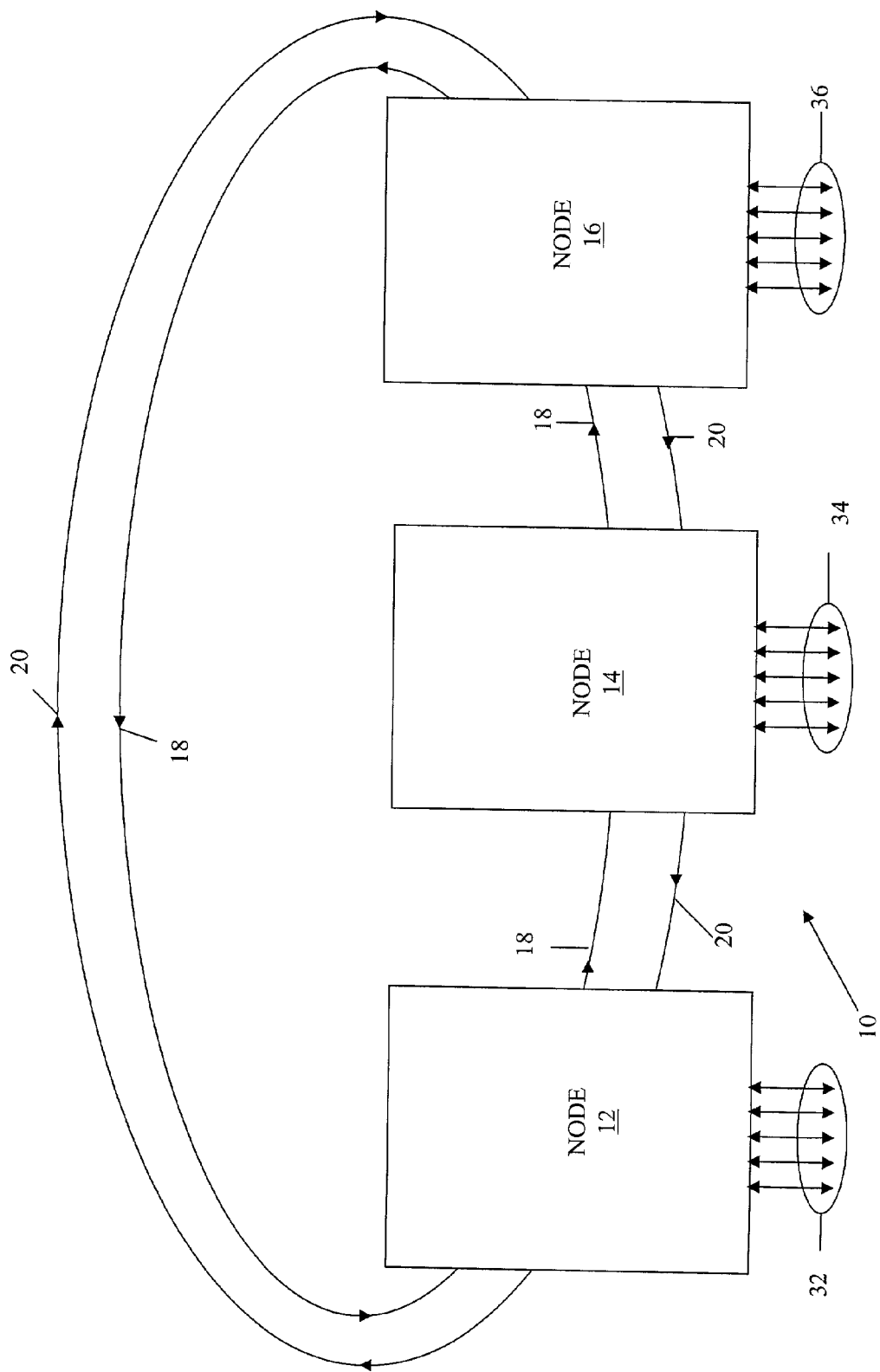
FIG. 1 depicts a schematic diagram of a SONET/SDH ring in accordance with the prior art.
Figure 2:
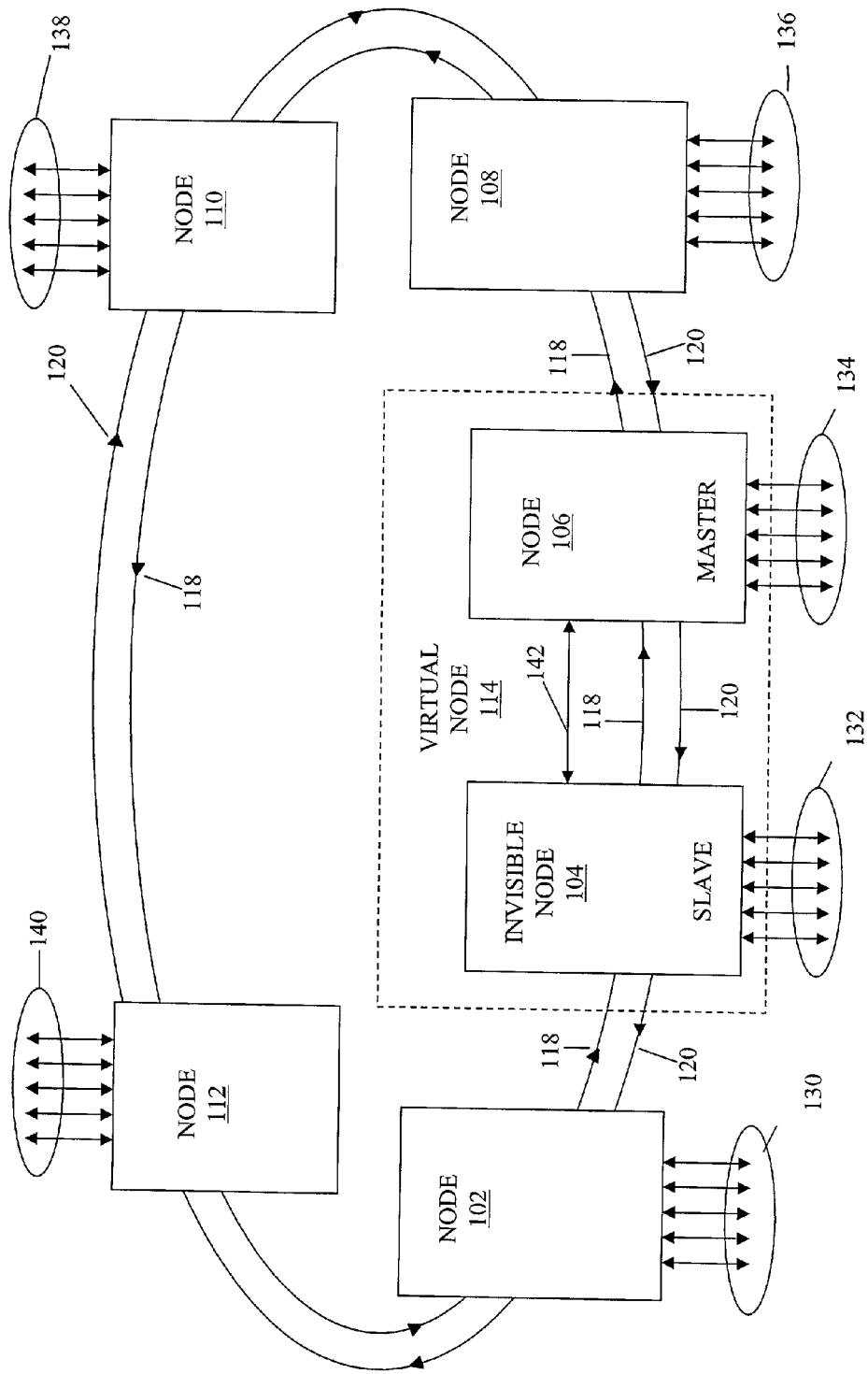
FIG. 2 depicts a schematic diagram of a SONET/SDH ring with an invisible node in accordance with an illustrative embodiment of this invention.

FIG. 2 represents a block diagram of SONET/SDH ring 100 in accordance with the illustrative embodiment of the present invention. SONET/SDH ring 100, which is similar to the SONET/SDH network 10 of FIG. 1, comprises a plurality of nodes, represented by nodes 102, 104, 106, 108, 110, and 112. In accordance with the illustrative embodiment, nodes 102, 104, 106, 108, 110, and 112 are assigned the following addresses in the address space of SONET/SDH ring 100:

TABLE 2

Node Addresses for SONET/SDH Ring 100

| Node | SONET/SDH Network 100 Address |
|---|---|
| Node 102 | 0 |
| Node 104 | Undefined ("NULL") |
| Node 106 | 1 |
| Node 108 | 2 |
| Node 110 | 3 |
| Node 112 | 4 |

In accordance with the illustrative embodiment, node 104 is not assigned an address and is, therefore, invisible to the other nodes in ring 100.

Each of nodes 102, 104, 106, 108, 110, and 112 supports a plurality of tributaries 130, 132, 134, 136, 138, and 140, respectively, which originate and terminate traffic, as is well known in the art. A pair of fiber optic transmission facilities 118 and 120 interconnects nodes 102, 104, 106, 108, 110, and 112. Data is transmitted on fiber optic transmission facility 118 in a counterclockwise direction and on fiber optic transmission facility 120 in a clockwise direction.

Node 104 and node 106 together compose a virtual node, virtual node 114. Within virtual node 114, node 106 is a "master" to "slave" invisible node 104, because it reacts to the $K_1$ and $K_2$ bytes of the line overhead that are addressed to/from master node 106. Furthermore, a communications link 142 between master node 106 and slave node 104 provides out-of-band communication between master node 106 and slave node 104. Communications link 142 can be a dedicated communication channel, an Ethernet connection, etc., as is known in the art.

Figure 3:
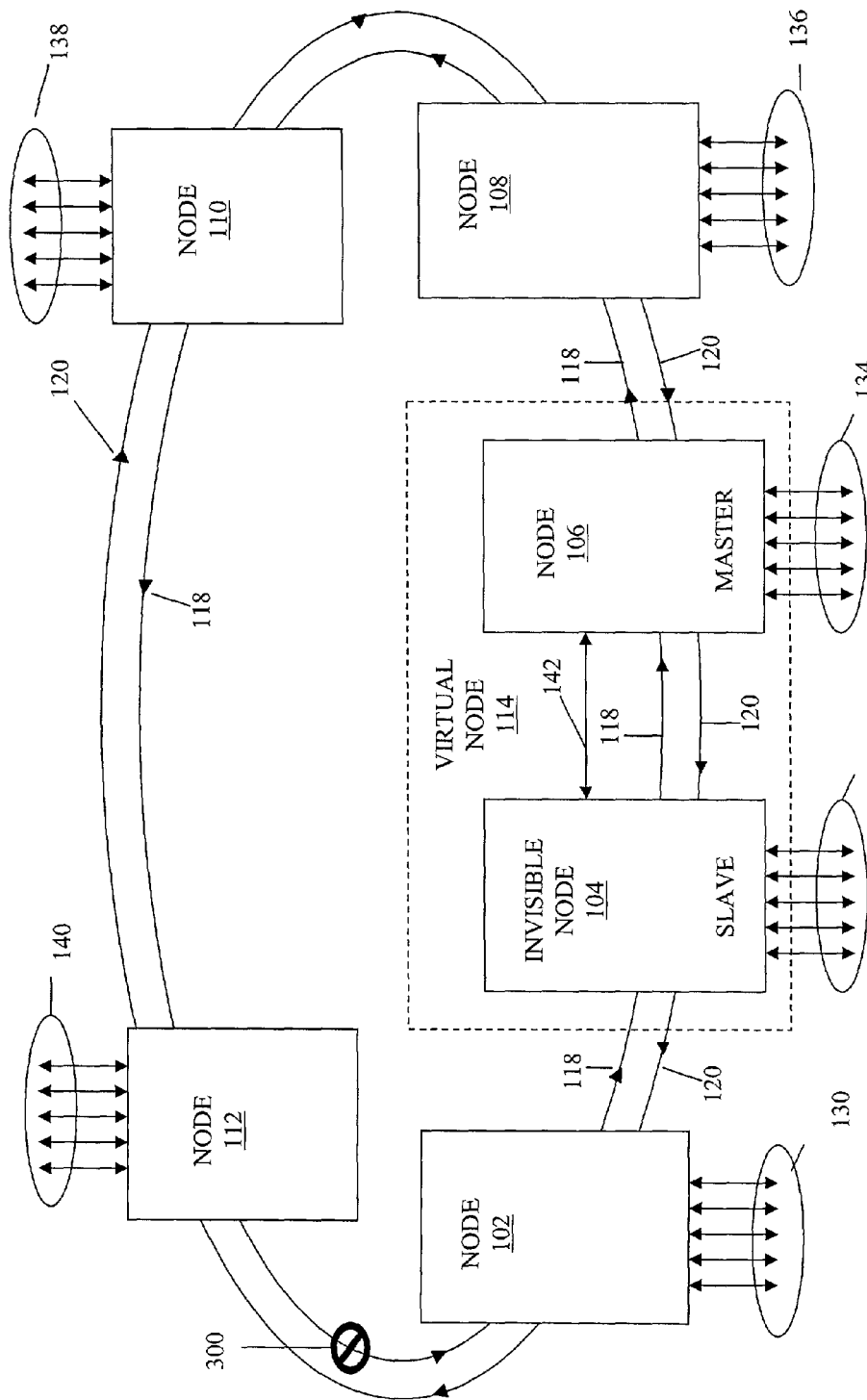
FIG. 3 depicts a schematic diagram of the SONET/SDH ring of FIG. 2 wherein a first example of automatic protection switching is illustrated in accordance with an illustrative embodiment of this invention.

Turning now to FIG. 3, the SONET/SDH ring 100 of FIG. 2 is illustrated with discontinuity 300 in fiber optical facility 118 (the counterclockwise ring) between nodes 102 and 112. For purposes of this example, node 112 transmits data to invisible node 104. Thus, the "short path" is nodes 112→102 and the "long path" is nodes 112→110→108→106→104→102. Node 102 detects the discontinuity in a manner that is well known in the art. Node 102 takes corrective action by reconfiguring its switching node and sending a protection switching alarm in both directions around ring 100.

Invisible node 104 learns of discontinuity 300 from node 102 in two ways.

First, node 102 sends the next STS-N frame overhead in the clockwise direction 120 (towards node 112) with the $K_1$ and $K_2$ bytes populated as follows:

| | | |
|---|---|---|
| $K_1$: | bits 1–4: | automatic protection switch request. |
| | bits 5–8: | the Node ID of node 112 ("4" in this example). |
| $K_2$: | bits 1–4: | its own Node ID ("0" in this example). |
| | bit 5: | short path. |
| | bits 6–8: | RDI. |

And second, node 102 sends the next STS-N frame overhead in the counterclockwise 118 direction (towards node 104) with the $K_1$ and $K_2$ bytes populated as follows:

| | | |
|---|---|---|
| $K_1$: | bits 1–4: | automatic protection switch request. |
| | bits 5–8: | the Node ID of node 112 ("4" in this example). |
| $K_2$: | bits 1–4: | its own Node ID ("0" in this example). |
| | bit 5: | long path. |
| | bits 6–8: | Bridged and switched State. |

Invisible node 104 receives the STS-N frame from the short path before node 106 receives it. Invisible node reads the STS-N header information, including the $K_1$ and $K_2$ bytes, and executes automatic protection switching (in this example, node 104 starts receiving the STS-N data that it is expecting from node 112 from the long path instead). Invisible node 104 then sends an STS-N frame to node 106 (the "master" node) but does not alter the $K_1$ and $K_2$ bytes. Master node 106 performs protection switching and any other functions and also does not modify the $K_1$ and $K_2$ bytes ("pass through mode"), as is well known in the art and, therefore, is not discussed further.

Figure 4:
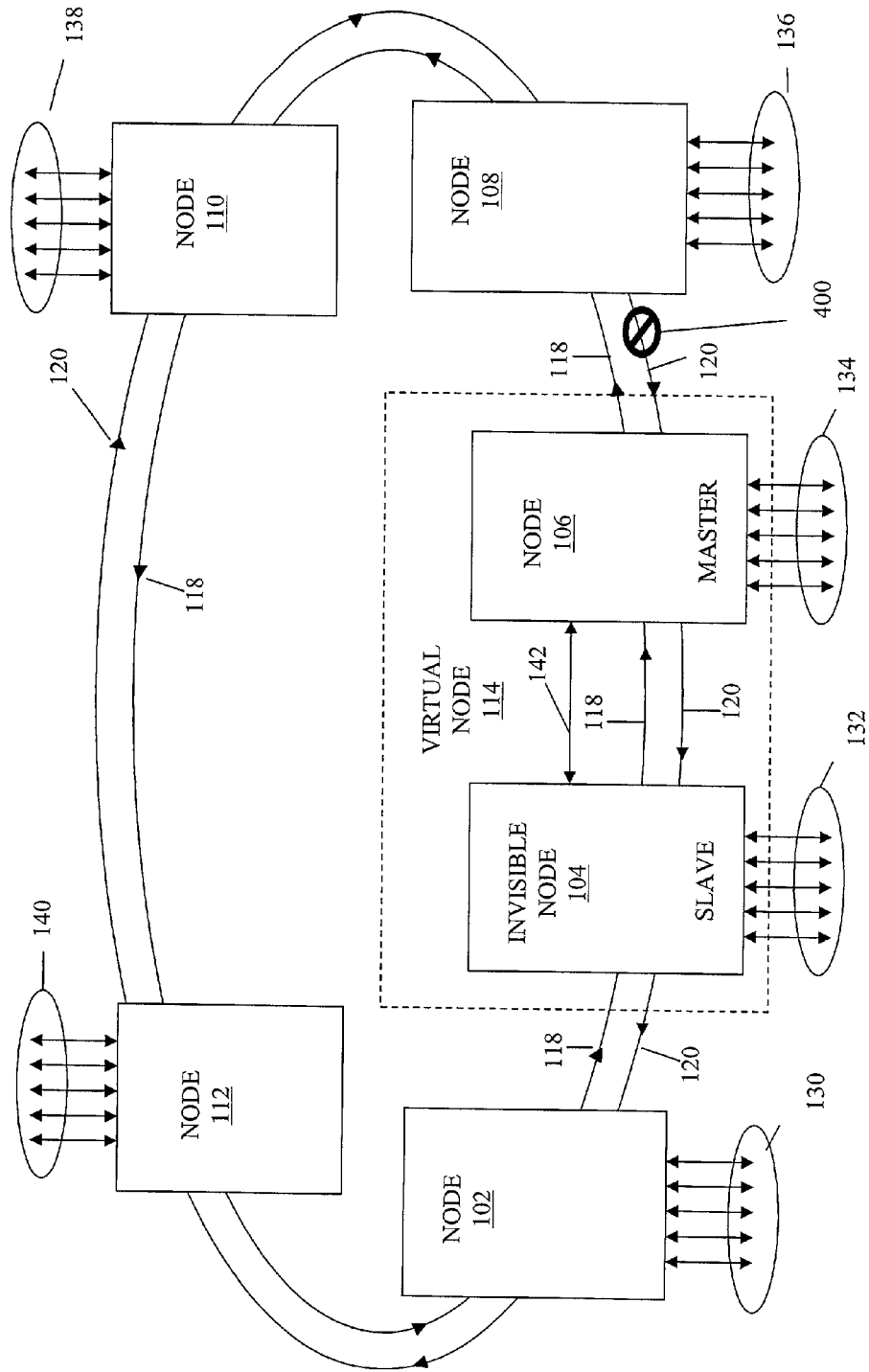
FIG. 4 depicts a schematic diagram of the SONET/SDH ring of FIG. 2 wherein a second example of automatic protection switching is illustrated in accordance with an illustrative embodiment of this invention.

FIG. 4 illustrates the SONET/SDH ring 100 of FIG. 2 with discontinuity 400 in fiber optical facility 120 (the clockwise ring) between nodes 106 and 108. For purposes of this example, node 108 is sending data to node 104. Thus the short path is node 108→106→104 and the long path is 108→110→112→102→104. Node 106 detects the discontinuity in a manner well known in the art. Node 106 takes corrective action by reconfiguring its switching node and sending a protection switching message in both directions.

Node 106 alerts node 108 of discontinuity 300 in two ways.

First, node 106 alerts node 108 of discontinuity 400 by sending the next STS-N frame overhead in the counterclockwise direction (towards node 110) with the $K_1$ and $K_2$ bytes populated as follows:

| | | |
|---|---|---|
| $K_1$: | bits 1–4: | automatic protection switch request. |
| | bits 5–8: | the Node ID of node 108 ("2" in this example). |

| | | |
|---|---|---|
| $K_2$: | bits 1–4: | its own Node ID ("1" in this example). |
| | bit 5: | short path. |
| | bits 6–8: | RDI. |

And second, node 106 alerts node 108 of discontinuity 400 by sending the next STS-N frame overhead in the clockwise direction (towards node 104) with the $K_1$ and $K_2$ bytes populated as follows:

| | | |
|---|---|---|
| $K_1$: | bits 1–4: | automatic protection switch request. |
| | bits 5–8: | the Node ID of node 108 ("2" in this example). |
| $K_2$: | bits 1–4: | its own Node ID ("1" in this example). |
| | bit 5: | long path. |
| | bits 6–8: | Bridged and Switched State. |

Invisible node 104 monitors the $K_1$ and $K_2$ bytes in the line overhead of the STS-N frame transmitted in the counterclockwise direction on optical fiber 118 and the $K_1$ and $K_2$ bytes in the line overhead of the STS-N frame transmitted in the clockwise direction on optical fiber 120 and performs automatic protection switching by looking for the data from node 108 on the long path.

In accordance with the illustrative embodiment of the present invention, there is a situation in which an invisible node does in fact modify the $K_2$ byte of the line overhead. In particular, the invisible node modifies the $K_2$ byte of the line overhead when it detects a discontinuity between itself and another node (either master or slave) within its virtual node. This is because the invisible node within the virtual node must inform one or more other nodes of the discontinuity.

Figure 5:
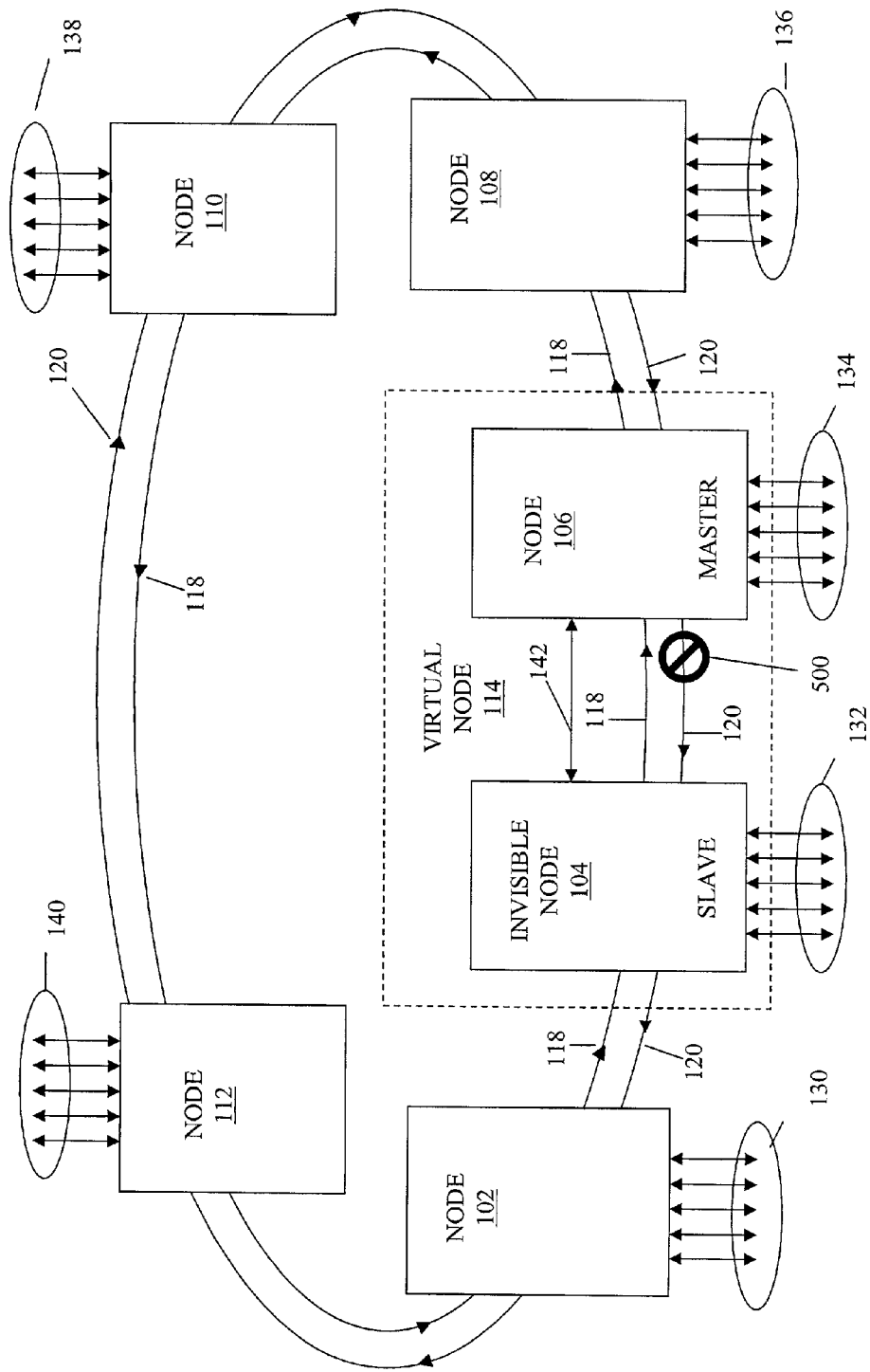
FIG. 5 depicts a schematic diagram of the SONET/SDH ring of FIG. 2 wherein a third example of automatic protection switching is illustrated in accordance with an illustrative embodiment of this invention.

For example, in FIG. 5, SONET/SDH ring 100 is illustrated with a discontinuity in fiber optical facility 120 between invisible node 104 and master node 106. If invisible node 104 did not exist, then node 106 would inform node 102 of the discontinuity in well-known fashion. But because invisible node 104 does exist and blocks node 102's ability to directly observe the discontinuity, node 104 must "pretend" to be node 106 and must inform node 102 of the discontinuity as if it were node 106.

Therefore, because the invisible node detects the discontinuity between itself and master node 106, invisible node 104 notifies node 102 of the situation by populating bits 6–8 of the $K_2$ byte with the next STS-N frame header with the Line Alarm Indication Signal (AIS-L) status. In this manner, the discontinuity is communicated to node 102 as if it were between node 102 and node 106. Once node 102 learns of the discontinuity, it performs automatic protection switching in well-known fashion.

Figure 6:
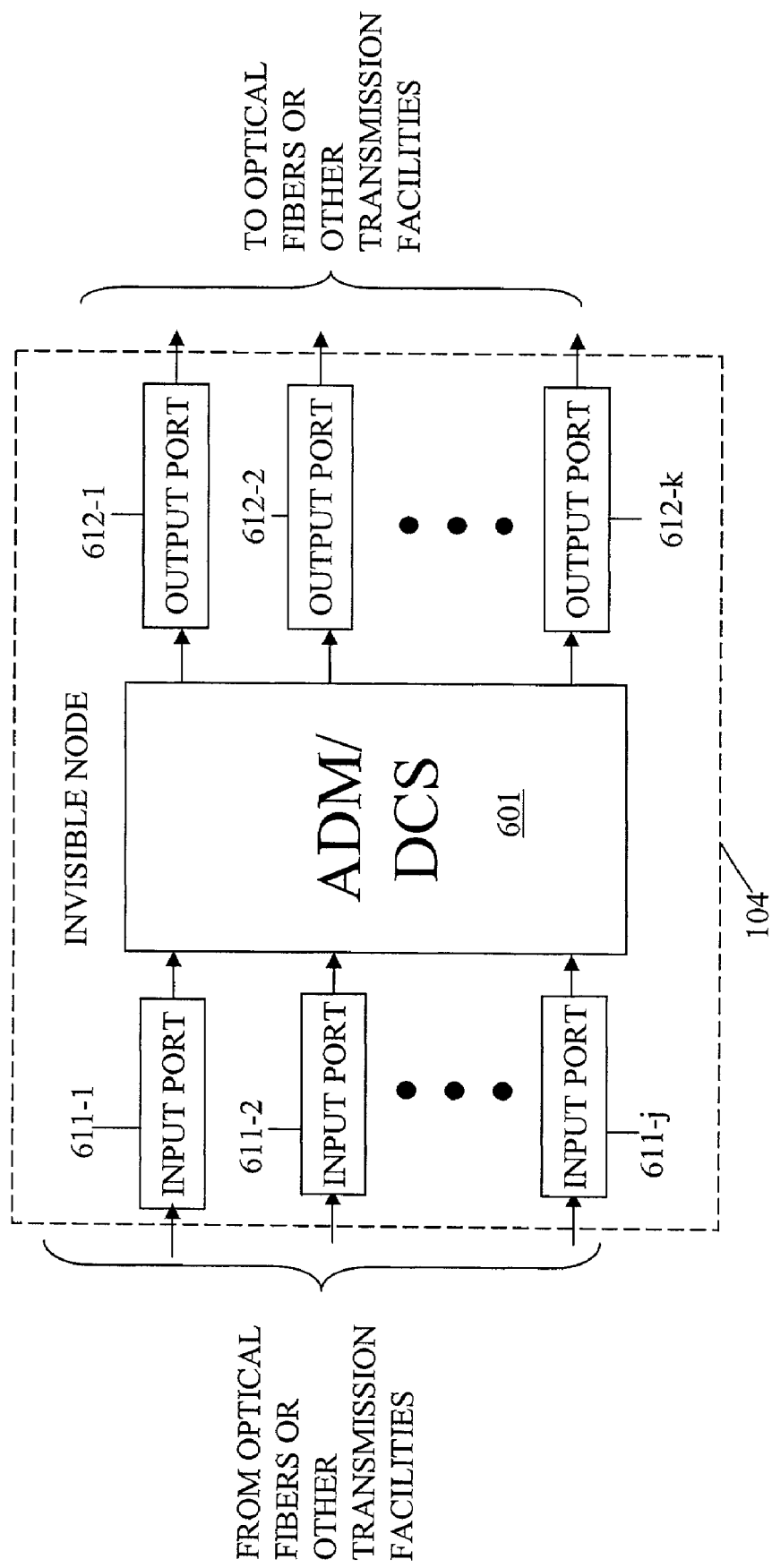
FIG. 6 depicts a block diagram of the salient components of an invisible node in accordance with the illustrative embodiment of this invention.

FIG. 6 depicts a block diagram of the salient components of invisible node 104, which comprises add/drop multiplexer-digital cross-connect system ("ADM/DCS") 601, input ports 611-1 through 611-j, and output ports 612-1 through 612-k, wherein j and k are positive integers and wherein j+k>2.

Each of input ports 611-1 through 611-j receives a signal (e.g., a low-rate tributary, a STS-N, etc.) from an optical fiber or other transmission facility (e.g., metallic wireline, microwave channel, etc.) and passes the signal to ADM/DCS 601, in well-known fashion. Each of output ports 612-1 through 612-k receives a signal from ADM/DCS 601 and transmits the signal via an optical fiber or other transmission facility, in well-known fashion. When invisible node 104 receives a signal from one or more tributaries, ADM/DCS 601 enables invisible node 104 to add the tributaries into one or more STS-Ns. When invisible node 104 transits a signal via one or more tributaries, ADM/DCS 601 enables invisible node 104 to drop the tributaries from one or STS-Ns.

For purposes of describing the illustrative embodiments of this invention, ADM/DCS 601 can be the same as or similar to the ADM/DCS described in U.S. patent application No. Ser. No. 09/974,448, filed Nov. 10, 2001, which is assigned to the present assignee and is incorporated herein by reference. ADM/DCS 601 can, however, be similar to any ADM/DCS heretofore known or used in the art.

Figure 7:
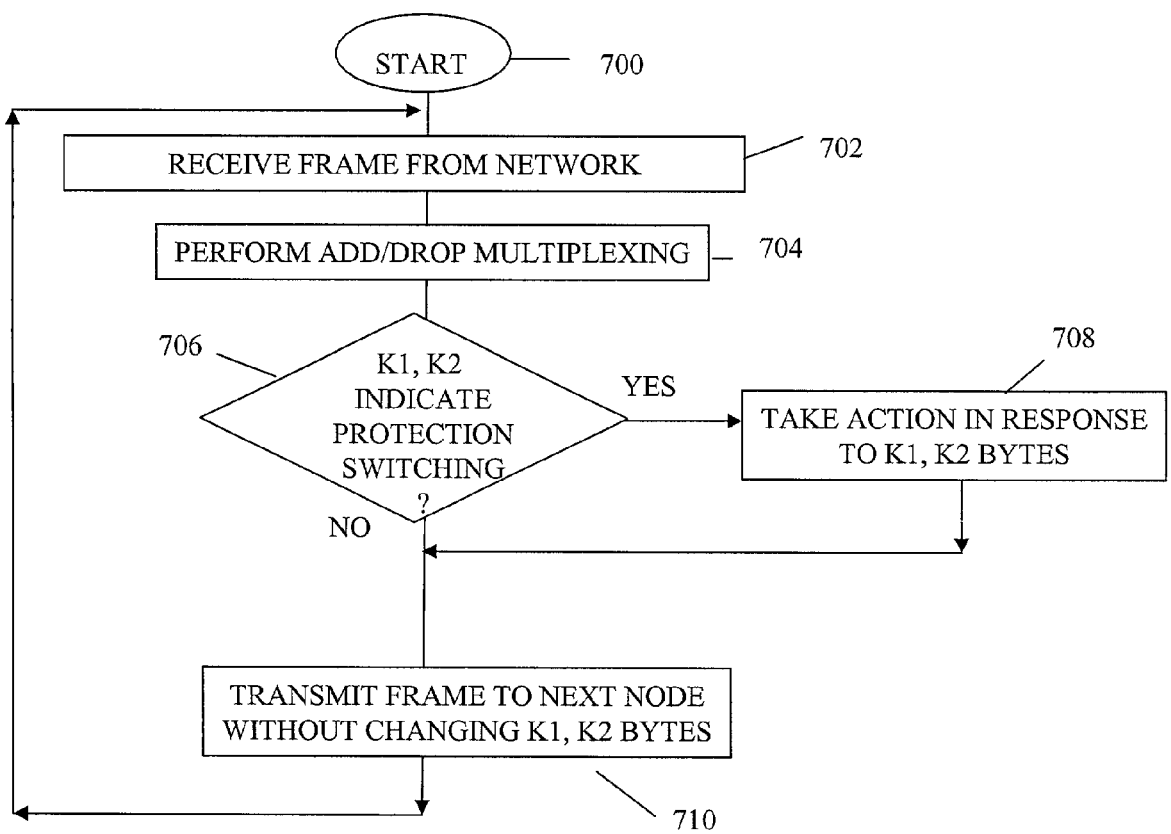
FIG. 7 depicts a flowchart of the operation of the invisible node of FIG. 6 in accordance with the illustrative embodiment of this invention.

In FIG. 7, the operation of an invisible node, such as invisible node 104 and ADM/DCS 601 is described. Operation starts in circle 700 and moves to action box 702, where the invisible node receives one or more signals that are associated with a SONET/SDH network. Processing continues in action box 704, where the invisible node terminates the lines as provisioned, including performing add/drop multiplexing, as known in the art.

Processing moves to decision diamond 706, where a determination is made whether the $K_1$ and $K_2$ bytes indicate protection-switching action should be taken. If protection-switching action is required, the invisible node takes action appropriate for protection switching (as provisioned) in action box 708. In contradiction to the prior art, the invisible node modifies the STS-N frame overhead information as appropriate, but does NOT modify the $K_1$ and $K_2$ bytes. Processing from action box 708 and the "no" leg of decision diamond 706 continues to action box 710, where the invisible node transmits a data signal via an optical fiber to the subsequent nodes in its ring. The next node in the ring, if it is not an invisible node, terminates the $K_1$ and $K_2$ bytes and takes appropriate action, including modify the $K_1$ and $K_2$ bytes. Processing loops back to 702.

Figure 8:
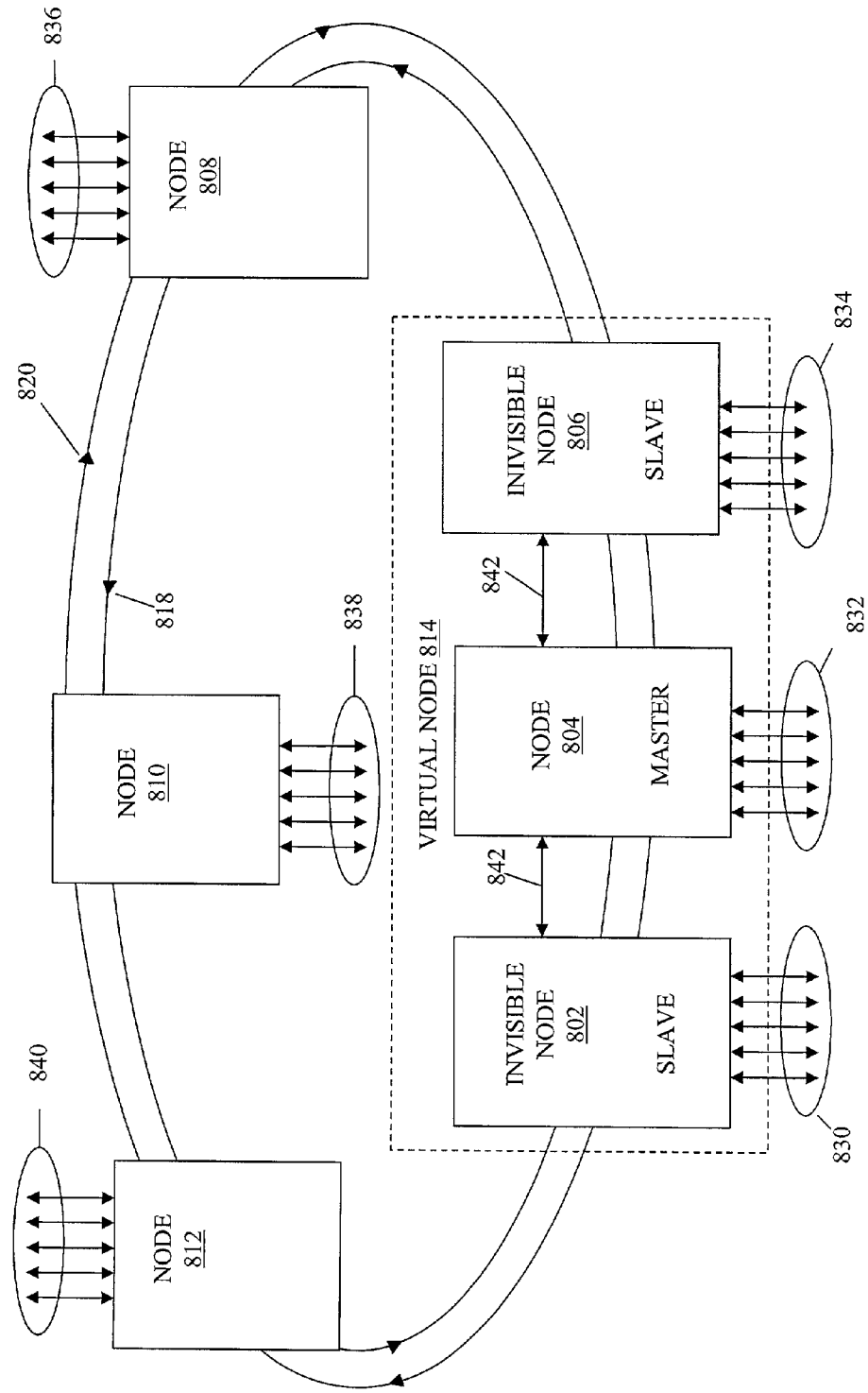
FIG. 8 depicts a schematic diagram of a SONET/SDH network ring with multiple invisible nodes in accordance with another illustrative embodiment of this invention.

There can be more than one invisible node in a network. FIG. 8 represents a block diagram of a further SONET/SDH network 800 in accordance with another aspect of this invention. According to this illustrative embodiment of this invention, there are a plurality of nodes connected in a ring, represented by nodes 802, 804, 806, 808, 810 and 812. The nodes are connected in a ring structure by optical transmission facilities 818 and 820. Each node 802, 804, 806, 808, 810 and 812 supports a plurality of tributaries 830, 832, 834, 836, 838 and 840, respectively, as is known in the art.

Nodes 802 and 806 are invisible nodes as defined above, and node 804 is the master node, thus forming virtual node 814. Each invisible node 802 and 806 communicates with master node 804 via communication links 842.

In accordance with this illustrative embodiment, node 802, 804, 806, 808, 810 and 812 are assigned the following addresses in the address space of SONET/SDH ring 800:

TABLE 3

Node Addresses for SONET/SDH Network 800

| Node | SONET/SDH Ring 800 Address |
|---|---|
| Node 802 | NULL |
| Node 804 | 0 |
| Node 806 | NULL |
| Node 808 | 1 |
| Node 810 | 2 |
| Node 812 | 3 |

Node 802 and node 806 are illustrated in Table 3 as having NULL addresses and are thus invisible nodes according to the exemplary embodiment of this invention.

Plural invisible nodes do not have to be in a particular order, such as the order illustrated in FIG. 8. Two (or more) invisible nodes can be connected to one side or the other side of the master node. Furthermore, there can be more than one virtual node in a ring. One skilled in the art will appreciate the variety of architectures available when using invisible nodes in a ring structure, after reviewing this specification.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A telecommunications network comprising:
    an automatic protection switching channel that defines an address space in said telecommunications network;
    a node that is uniquely identified by an address in said address space; and
    a node that is not uniquely identified by an address in said address space.

2. The telecommunications network of claim 1 wherein said telecommunications network is a SONET/SDH ring.

3. The telecommunications network of claim 2 wherein said automatic protection switching channel comprises a $K_1$ byte and a $K_2$ byte, and wherein bits 5–8 of said $K_1$ byte and bits 1–4 of said $K_2$ byte define said address space.

4. The telecommunications network of claim 3 wherein only said node that is identified by a unique address in said address space modifies said $K_1$ byte.

5. The telecommunications network of claim 3 wherein both said node that is identified by a unique address in said address space and said node that is not identified by a unique address in said address space modify said $K_2$ byte.

6. The telecommunications network of claim 3:
    wherein said node that is uniquely identified by an address in said address space and said node that is not uniquely identified by an address in said address space are adjacent; and
    wherein said node that is not uniquely identified by an address in said address space modifies bits 6–8 of said $K_2$ byte only when it detects a discontinuity between itself and said node that is uniquely identified by an address in said address space.

7. A system comprising:
    a virtual node in a SONET/SDH ring that comprises an automatic protection switching channel that comprises a $K_1$ byte and a $K_2$ byte, wherein said $K_1$ byte and said $K_2$ byte define an address space, wherein said virtual node comprises:
    a master node that is uniquely associated with an address in said address space; and
    at least one invisible node that is not uniquely associated with an address in said address space.

8. The system of claim 7 wherein said virtual node comprises a plurality of invisible nodes.

9. The system of claim 7 wherein said address space is defined in $K_1$ and $K_2$ bytes of overhead data and wherein only said master node effects modification of said $K_1$ byte.

10. The system of claim 7 wherein said address space is defined in $K_1$ and $K_2$ bytes of overhead data and wherein said invisible node takes action in accordance with said $K_1$ and $K_2$ bytes.

11. The system of claim 7 wherein said address space is defined in $K_1$ and $K_2$ of overhead data and wherein said invisible node does not modify said $K_1$ byte.

12. The system of claim 7 further comprising a communications link that connects said master node and said invisible node.

13. An invisible node in a SONET/SDH ring, wherein said SONET/SDH ring defines an address space, and wherein said invisible node comprises a SONET/SDH add-drop multiplexer connected in said SONET/SDH ring without an address in said address space of said SONET/SDH ring, wherein:
    said SONET/SDH add-drop multiplexer is configured to receive data from one or more tributaries and multiplex said data on said ring;
    said SONET/SDH add-drop multiplexer is configured to demultiplex data from said ring and send said data on one or more of said tributaries; and
    said SONET/SDH add-drop multiplexer is configured to perform automatic protection switching responsive to notification from said ring.

14. An invisible node in accordance with claim 13 wherein said ring transports said data in STS-N frames, wherein said STS-N frames have overhead wherein said address space is defined, and wherein said SONET/SDH add-drop multiplexer is further configured to perform automatic protection switching responsive to notification of a predetermined address in said address space.

15. An invisible node in accordance with claim 14 further comprising a master node having an address in said address space of said SONET/SDH ring, wherein said SONET/SDH add-drop multiplexer is responsive to said address of said master node.

16. A SONET/SDH ring having an automatic protection switching channel that comprises an automatic protection switching channel that comprises a $K_1$ byte and a $K_2$ byte, said SONET/SDH ring comprising:
    a node in said SONET/SDH ring that modifies said $K_1$ byte and said $K_2$ byte; and
    a node in said SONET/SDH ring that modifies said K2 byte but not said $K_{1\ byte}$.

17. The SONET/SDH ring of claim 16 wherein said SONET/SDH ring defines an address space and wherein said nodes in said SONET/SDH ring that modify said $K_1$ byte and said $K_2$ byte are identified by a unique address in said address space.

18. The SONET/SDH ring of claim 16 wherein said SONET/SDH ring defines an address space and wherein said nodes in said SONET/SDH ring that modify said $K_2$ byte but not said $K_1$ byte are not identified by a unique address in said address space.

19. A method for controlling an invisible node in a SONET/SDH ring, wherein:
    said SONET/SDH ring defines an address space;
    said invisible node does not have an address in said address space;
    said invisible node is connected to a plurality of tributaries; and
    said SONET/SDH ring transports STS-N frames having header information and data; said method comprising:
    responding to receipt of an STS-N frame by:
        demultiplexing data destined for one or more of said tributaries;
        multiplexing data received at said tributaries for another node in said SONET/SDH ring;
        and modifying said header information accordingly;
    responding to header information regarding automatic protection switching; and
    not modifying header information regarding automatic protection switching.

* * * * *